Patented Mar. 12, 1940

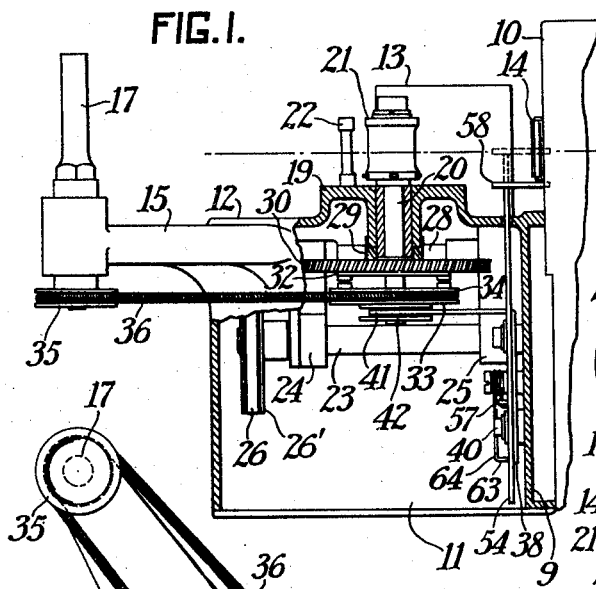

2,193,031

UNITED STATES PATENT OFFICE 2,193,031

REWINDING MECHANISM FOR MOTION PICTURE PROJECTORS

Donald F. Lyman and Howard C. Wellman, Rochester, N. Y., assignors to Eastman Kodak Company, Rochester, N. Y., a corporation of New Jersey Application May 11, 1937, Serial No. 141,974

12 Claims. (Cl. 88—17)

This invention relates to motion picture projectors, and particularly to a mechanism for alternately driving the supply and takeup reels for rewinding and projecting purposes; and a means for shifting said mechanism to prevent threading of the apparatus when in rewinding position.

One object of the present invention is the provision of a driving mechanism for the supply and takeup reels of a motion picture projector of such a nature that the projector is placed in either the projecting condition or the rewind condition through the movement of a single lever. Another object is to provide a driving mechanism for the supply and takeup reels which comprises a separate driven member connected to each reel spindle and movable into and out of driving engagement with a continuously operating mechanism, said driven members being so connected that the movement of one thereof into engagement with the operating mechanism through the action of a lever connected thereto will cause the other driven member to disengage the operating mechanism and vice versa. And still another object is to provide a shift lever for shifting the drive of the mechanism to and from the rewind position, said shift lever being adapted when in a position to connect the drive for rewinding to extend into the film path of the projector so that the threading operation can not be performed while the mechanism is connected for rewinding purposes.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a plan view of the driving mechanism of a motion picture projector, partly broken away and partly in section for purposes of clarity, and showing the preferred embodiment of our invention, Fig. 2 is a side elevation of the driving mechanism of the projector, and showing the driving connections for the supply and takeup reels, Fig. 3 is a front elevation of the projector taken on line 3—3 of Fig. 2, and showing the shifting mechanism in position to connect the takeup spindle and disconnect the supply spindle from the operating mechanism for projecting purposes, and Fig. 4 is similar to Fig. 3, but shows the shifting mechanism in position to connect the supply spindle and disconnect the takeup spindle from the operating mechanism for rewinding purposes.

Like reference characters refer to corresponding parts throughout the drawing.

Referring to the drawing, the projector as a whole consists of two parts, a lamphouse 10 in which an incandescent lamp, not shown, may be mounted and to which a supporting member, not shown, may be fixed in any suitable manner; and a mechanism housing 11 which is mounted forward of and to one side of the lamphouse 10. On the side wall 12 of the housing 11 is mounted the usual objective ring 13 which supports an objective, not shown, in alignment with a projection opening, not shown, in the front wall of the lamphouse 10. Mounted on the front wall of the lamphouse, between and in alignment with the objective ring 13 and the projection opening, is a film gate 14 which may be of any suitable form, and which is adapted to guide a film strip past the objective for projection purposes.

Fixed to and extending from the mechanism housing 11 are a pair of reel arms 15 and 16, the reel arm 15 extending upwardly from the housing and having a supply spindle 17 rotatably mounted in the end thereof for supporting a supply reel of film, and the reel arm 16 extending below the housing 11 and having a takeup spindle 18 rotatably mounted in the end thereof for supporting a takeup reel. The side wall 12 of the mechanism housing 11 is provided with a pair of bearing portions 19 and 19', one being located above and one below the objective ring 13, and in which sprocket shafts 20 and 20' respectively are journaled. Film sprockets 21 and 21' fixed to the end of the sprocket shafts 20 and 20' are in vertical alignment with the supply spindle 17, the takeup spindle 18, and the objective ring 13; and constitute the film feeding means for advancing a film strip from the supply reel to the takeup reel. When the film strip is properly threaded over the sprockets 21 and 21', it is held thereon by the guide members 22 which are fixed to the side wall 12 and extend therefrom into the film path adjacent said sprockets. The operating mechanism for the projector includes the shaft 23 which is journaled at both ends in gear housings 24 and 25 fixed to the end walls of the mechanism housing, said shaft being driven from a motor, not shown, through the belt 26 engaging the pulley 26' fixed to the end of the shaft. A second shaft 28 journaled in the gear housings 24 and 25 is driven from the shaft 23 through the medium of gears, not shown, but which are enclosed in the gear housings 24 and 25; and fixed to shaft 28 is a worm 29. Worm gears 30 and 31 fixed to the sprocket shafts 20 and 20' are in constant engagement with the worm 29, and each have a clutch member 32 fixed to the outside face thereof. Pulleys 33 and 33' mounted on the sprocket shafts 20 and 20' respectively, so as to be rotatable and movable axially of the shafts, have clutch members 34 fixed to the inside face thereof which are adapted to be moved into or out of driving engagement with the clutch members 32 on the worm gears 30 and 31. Pulley 33 is connected to the pulley 35 fixed to the end of the supply spindle 17 by a coil spring belt 36, and pulley 33' is connected to the pulley 37 fixed to the takeup spindle 18 by the coil spring belt 38, see Fig. 2.

For the purposes of projection it is necessary to have the sprockets driven, the takeup spindle driven, and the supply spindle idle. On the other hand, for rewinding purposes, it is necessary to have the supply spindle driven and the takeup spindle running idle, the drive for the sprockets being of no consequence since rewinding is effected by running the film directly from reel to reel outside of the projector proper. In order to effect this change in drive for the reel spindle automatically through the actuation of a single lever which in itself prohibits the threading of the projector when holding the drive in a rewind position, the following shifting mechanism is used. An L-shaped rewind shift lever 38 is slidably mounted on the rear wall 9 of the mechanism housing 11 by having slots 39 in one arm thereof engaging studs 40 projecting from the rear wall 9. The other arm of the rewind shift lever 38 is forked, as shown at 41, to engage a grooved collar 42 fixed to the rewind pulley 33 so that a movement of the shift lever will move the clutch member 34 on the rewind pulley 33 into and out of driving engagement with the clutch member 32 on the worm gear 30. An L-shaped takeup shift lever 43, identical with the rewind shift lever 38, is slidably mounted on the rear wall 9 by having slots 44 engaging studs 45 extending from said wall. This takeup shift lever has a forked end 46 which engages a grooved collar 47 fixed to the pulley 33' so that a movement of the shift lever will move the clutch member 34 and the takeup pulley 33' into and out of driving engagement with the clutch member 32 on the worm gear 31.

A connecting lever 48 pivoted to the rear wall 9 by screw 49 has one forked end 50 engaging pin 51 fixed to the rewind shift lever 38 and the other forked end 52 engaging a pin 53 fixed to the takeup shift lever 43 so that a movement of the rewind shift lever in one direction to effect a driving connection between the rewind pulley 33 and the worm gear 30 will cause the takeup shift lever to move the takeup pulley 31 out of driving engagement with the worm gear 31 and vice versa. The lever actuating member 54 slidably mounted on the rear wall 9 atop the rewind shift lever 38 by having slots 55 engaging the studs 40, has a slot 56 therein through which an ear 57, turned up from the rewind shift lever 38, extends to afford a connection between the two. The lever actuating member 54 extends out of the mechanism housing 11, see Fig. 1, and has the end 58, which is gripped by the fingers for moving the same, turned at right angles to the lever proper and pointed to extend into an elongated recess 59 extending across the front of the lamphouse 10 above the film gate 14.

The lever actuating member 54 is normally moved to the position shown in Fig. 3 through the action of the arm 60 of the spring coiled around the stud 61 fixed to the rear wall 9 and acting on an ear 62 turned up from the lever actuating member adjacent the slot 56 therein, wherein the edge of the slot 56 engages the ear 57 on the rewind shift lever 38 to move said lever to the right and disengage the rewind pulley 33 from the worm gear 30, a movement which is transmitted to the takeup shift lever in an opposite sense to move the takeup pulley 33' into driving engagement with the worm gear 31. When the lever actuating member 54 is in this position, the end 58 thereof is moved out of vertical alignment with the sprocket 21 and the film gate 14, see Figs. 1 and 3, and the projector can be threaded. When it is desired to rewind the film from the takeup reel to the supply reel, the lever actuating member is pulled out to the position shown in Fig. 4 wherein the edge of the slot 56 engages the ear 57 on the rewind shift lever 38 to move the same to the left and at the same time move the rewind pulley 33 into driving engagement with the worm gear 30 whereupon the takeup pulley 33' is moved out of engagement with respect to the worm gear 31. The lever actuating member 54 is held in this latter or rewind position by the spring arm 64, the inturned end 63 of which snaps into a notch 65 in the lower edge of the lever actuating member. This spring arm is strong enough to hold the lever actuating member in its rewind position, but is flexible enough so that a pressure on the actuating member will disengage the spring from the notch and allow the other spring arm 60 to return the lever actuating member to the position shown in Fig. 3 wherein the takeup spindle 18 is driven and the supply spindle 17 is released to rotate idly.

When the lever actuating member 54 is in the position to connect the reel spindle for projection purposes, see Fig. 3, the end 58 thereof is removed from the film path and a threading of the projector can be accomplished. However, when the lever actuating member is moved to the position to connect the supply reel spindle for rewind purposes, see Fig. 4, the end 58 thereof is moved into vertical alignment with the objective ring 13 and obstructs the film gate 14 so that the apparatus cannot be threaded while the mechanism is in position to effect the rewinding operation. Inasmuch as the movement of the shift levers 38 and 43 necessary to make and break the driving connection with the reel spindle is relatively small compared to the movement of the lever actuating member in moving into and out of the film path, a lost motion connection is provided between the lever actuating member 54 and the rewind shift lever 38. This loss of motion connection is provided by making the slots 55 and 56 in the lever actuating member of such a length that the lever actuating member does not pick up the rewind shift lever 38 until it has moved toward one of its final positions to a point which is removed from said final positions by an amount equal to the movement of the rewind shift lever in making or breaking the drive connection between the rewind pulley 33 and the worm gear 30.

From the above description it will be readily understood that we have provided a projection apparatus wherein the shift from a projecting to a rewind position and vice versa is accomplished in a simple manner through the actuation of a single lever thus avoiding the difficulty which arises in present apparatus of this kind which require a movement of more than one lever to shift from the projecting to the rewinding condition and vice versa, or in which the shift into a rewinding condition by the actuation of one lever could not be effected until the apparatus was released from the takeup condition by the actuation of the second lever. Those skilled in the art will appreciate the waste of time and film which can come about if, after threading, the projector is started while in a rewind position. By providing a positive stop which prevents the threading operation until the projector has been shifted to its projection position, the present structure provides a projection apparatus which is fool proof against this last-mentioned undesirable occurrence.

Although we have shown and described certain specific embodiments of our invention, we are fully aware that many modifications thereof are possible. Our invention, therefore, is not to be restricted except in so far as is necessitated by the prior art and by the spirit of the appended claims.

Having thus described our invention, what we claim is new and desire to secure by Letters Patent of the United States is:

1. A motion picture apparatus comprising a support, an objective mounted on said support, a supply spindle rotatably mounted on said support and for supporting a supply reel of film, a take-up spindle rotatably mounted on said support for supporting a take-up reel, film feeding means for feeding a film strip from the supply reel, past the objective, and to the take-up reel, driving means for the supply spindle for rewind purposes, and means for starting and stopping said driving means, said means adapted when the driving means is in operative position to obstruct the normal film path whereby the film strip cannot be properly threaded through the apparatus from the supply reel to the take-up reel.

2. A motion picture apparatus comprising a support, an objective on said support, a film gate for guiding a film strip past said objective, a supply spindle rotatably mounted on the support and for supporting a supply reel of film, a take-up reel rotatably mounted on the support to receive the film from the supply reel after it has passed through the film gate, driving means for the supply spindle for rewinding purposes, an actuating member for starting and stopping said drive means, and adapted to extend across the film gate when the driving means is in operative position to prevent the threading of the film strip therethrough.

3. A motion picture apparatus comprising a support, an objective mounted thereon, a film gate for guiding a film strip past said objective, a supply spindle rotatably mounted on said support and for supporting a supply reel of film, a take-up reel rotatably mounted on the support to receive the film from the supply reel after it has passed through the film gate, means for driving said supply spindle for rewinding purposes, said means including a continuously operating driving member, a driven member connected to said supply spindle and movable into and out of driving engagement with said driving member, and an actuating member connected to said driven member, and for moving said driven member into and out of engagement with the driving member, said actuating member adapted when the driven member is in engagement with the driving member to extend into the path of the film strip adjacent said film gate and obstruct said gate whereby the apparatus cannot be threaded when in condition for rewinding.

4. A motion picture apparatus comprising a support, an adjective mounted thereon, a film gate for guiding a film strip past said objective, a supply spindle rotatably mounted on the support and for supporting a supply reel of film a take-up reel rotatably mounted on the support, film feeding means for feeding a strip of film from the supply reel, through the film gate, and to the take-up reel, a continuously operating mechanism for driving said film feeding means, a driven member connected to said supply spindle and movable into and out of driving engagement with said operating mechanism for rewinding purposes, and a shift lever slidably mounted on the support and connected to the driven member for moving the same into and out of engagement with the operating mechanism, one end of said shift lever adapted, when in a position to hold the driven member in engagement with the operating mechanism, to extend into the film path adjacent the film gate, for preventing the threading of the apparatus when in condition for rewinding.

5. A motion picture apparatus comprising a support, an objective mounted thereon, a film gate for guiding a film strip past said objective, a supply spindle rotatably mounted on the support and for supporting a supply reel of film, a take-up reel rotatably mounted on the support, film feeding means for feeding a strip of film from the supply reel, through the film gate, and to the take-up reel, a continuously operating mechanism for driving said film feeding means, and including a gear having a clutch member fixed thereto, a driven member connected to said supply spindle and having a clutch element fixed thereto, said driven member being movable relative to said gear whereby the clutch elements may be brought into or moved out of driving engagement for rewinding purposes, and a shift lever slidably mounted on the support and connected to the driven member for moving the same into and out of driving engagement with the gear, said shift lever adapted, when in position to hold the driven member in engagement with the gear, to extend across the film gate for preventing the threading of the apparatus.

6. A motion picture apparatus comprising a support, an objective mounted thereon, a film gate for guiding a film strip past said objective, a supply spindle rotatably mounted on the support and for supporting a supply reel of film, a take-up spindle rotatably mounted on the support and for supporting a take-up reel, film feeding means for feeding a film strip from the supply reel, through the film gate, and to the take-up reel, a continuously operating mechanism for driving said film feeding means, a first driven member connected to said supply spindle and movable into and out of engagement with said operating mechanism for rewinding purposes, a second driven member connected to said take-up spindle and movable into and out of driving engagement with said operating mechanism for take-up purposes, an actuating member connected to each of the driven members and adapted to move them alternately into and out of driving engagement with the operating mechanism whereby when the first driven member is in engagement with operating mechanism for rewinding purposes, the second driven member will be moved out of engagement and vice versa, a portion of said actuating member adapted to extend into the normal film path of the apparatus when in position to connect the first driven member with the operating mechanism for rewinding purposes and for preventing a threading of the apparatus when in rewinding condition.

7. A motion picture apparatus comprising a support, an objective mounted thereon, a film gate for guiding a film strip past said objective, a supply spindle rotatably mounted on the support, and for supporting a supply reel of film, a take-up spindle rotatably mounted on the support, and for supporting a take-up reel which is adapted to receive a film strip from the supply reel after it has passed through the film gate, a driving mechanism on the support, a first driven member connected to the supply spindle and movably mounted on the support to be moved into and out of driving engagement with said driving mechanism for the purpose of rewinding, a second driven member connected to said take-up spindle and movably mounted on the support to be moved into and out of driving engagement with said driving mechanism for take-up purposes, and a lever system movably mounted between two positions on the support and connected to each of said driven members, said lever system adapted in one position to move the second driven member into and the first driven member out of engagement with the operating mechanism for take-up purposes, and in its second position to reverse said connections for rewind purposes, a portion of said lever system adapted, when the lever is in the second position, to extend into and obstruct the normal film path to prevent threading of the apparatus.

8. A motion picture apparatus comprising a support, an objective mounted thereon, a film gate for guiding a film strip past said objective, a supply spindle rotatably mounted on the support, and for supporting a supply reel of film, a take-up spindle rotatably mounted on the support, and for supporting a take-up reel which is adapted to receive a film strip from the supply reel after it has passed through the film gate, a driving mechanism on the support and including two gears, a first driven member connected to the supply spindle and movable into and out of driving engagement with one of said gears for rewinding purposes, a second driven member connected to the take-up spindle and movable into and out of driving engagement with the other of said gears for take-up purposes, a shift lever connected to the first driven member for moving the same into and out of engagement with one of said gears, a second shift lever connected to the second driven member for moving the same into and out of driving engagement with the other of said gears, a connection between said shift levers whereby the movement of one shift lever to move its associated driven member into driving engagement with the driving mechanism causes the other shift lever to move so as to disconnect its associated driven member from the driving mechanism and vice versa, and an actuating member connected to one of said shift levers and adapted to move the same to alter the driving connection between the two reels, the end of said actuating member being adapted to extend into the normal film path and prevent threading of the apparatus when it is in the position to connect the supply spindle to the driving mechanism.

9. A motion picture apparatus comrising a support, an objective mounted thereon, a film gate for guiding a film strip past said objective, a supply spindle rotatably mounted on the support, and for supporting a supply reel of film, a take-up spindle rotatably mounted on the support, and for supporting a take-up reel, film feeding means for moving a film strip from the supply reel, through the film gate, and to the take-up reel, a continuously operating mechanism for driving said film feeding means, and including two gears, a clutch element connected to each of said gears to rotate therewith; a first driven member connected to said supply spindle and movable to and from one of said gears for rewind purposes, a second driven member connected to said take-up spindle and movable to and from said other gear for take-up purposes, a clutch element on each of said driven members and adapted to operatively engage the clutch members on said gears when the driven members are moved toward their respective gears, whereby said driven members are positively connected to said gears to be driven thereby; and a single actuating member movable between two positions, and means connecting said actuating member to each of said driven members for moving the same toward and from their respective gears in alternate relation, whereby said actuating member when moved to one position is adapted to connect one of said driven members to its associated gear and disconnect the other member from its associated gear, and when moved to its second position is adapted to reverse said connections.

10. A motion picture apparatus comprising a support an objective mounted thereon, a film gate for guiding a film strip past said objective, a supply spindle rotatably mounted on the support, and for supporting a supply reel of film, a take-up spindle rotatably mounted on the support, and for supporting a take-up reel which is adapted to receive a film strip from the supply reel after it has passed through the film gate, a driving mechanism on the support, and including two constantly driven gears a first driven pulley connected to the supply spindle by a belt and movably mounted on the support to be moved into and out of driving engagement with one of said gears for the purpose of rewinding, a second driven pulley connected to said take-up spindle by a belt and movably mounted on the support to be moved into and out of driving engagement with the other of said gears for take-up purposes, and a lever system movably mounted between two positions on the support and connected to each of said pulleys, said lever system adapted in one position to move the second pulley into and the first pulley out of driving engagement with their respective gears for take-up purposes, and in its second position adapted to reverse said connections for rewind purposes.

11. A motion picture apparatus comprising a support, an objective mounted thereon, a film gate for guiding a film strip past said objective, a supply spindle rotatably mounted on the support, and for supporting a supply reel of film, a take-up spindle rotatably mounted on the support, and for supporting a take-up reel which is adapted to receive a film strip from the supply reel after it has passed through the film gate, a driving mechanism on the support and including two constantly driven gears, a first driven member connected to the supply spindle by a belt and movable into and out of positive driving engagement with one of said gears for rewinding purposes, a second driven member connected to the take-up reel by a belt and movable into and out of positive driving engagement with the other of said gears for take-up purposes, a shift lever connected to the first driven member for moving the same into and out of engagement with one of said gears, a second shift lever connected to the second driven member for moving the same into and out of driving engagement with the other of said gears, connecting means between said shift levers whereby the movement of one shift lever to move its associated driven member into driving engagement with the driving mechanism causes the other shift lever to move so as to disconnect its associated driven member from the driving mechanism and an actuating member connected to one of said shift levers and adapted to move the same to alter the driving connection between the two spindles.

12. A motion picture apparatus comprising a support, an objective mounted thereon, a film gate for guiding a film past said objective, a supply spindle rotatably mounted on the support, and for supporting a supply reel of film, a take-up spindle rotatably mounted on the support and for supporting a take-up reel which is adapted to receive a film strip from said supply reel after it has passed through the film gate, a film feeding mechanism including two constantly driven gears, a clutch element on each of said gears, a first pulley rotatably and slidably mounted on said support adjacent one of said gears and connected to said supply spindle by a belt, a second pulley rotatably and slidably mounted on said support adjacent the other of said gears and connected to said take-up spindle by a belt, a clutch element on each of said pulleys adapted to engage the clutch element on one of said gears when moved toward said gear to connect the two in driving engagement, a shift lever connected to said first pulley and movably mounted on said support and adapted to move said pulley into and out of driving engagement with its associated gear, a second shift lever connected to said second pulley and movably mounted on said support and adapted to move said pulley into and out of driving engagement with its associated gear, and a double-ended lever pivoted to said support and connected at each end to one of said shift levers, whereby movement of one of said shift levers in a direction to connect one of said pulleys to its associated gear causes a simultaneous movement of said other shift lever in a direction to disconnect said other pulley from its associated gear.

DONALD F. LYMAN.
HOWARD C. WELLMAN.